(12) United States Patent
Mahoney

(10) Patent No.: US 9,838,835 B2
(45) Date of Patent: Dec. 5, 2017

(54) SYSTEMS AND METHODS FOR PROVIDING TEXT BEACONS

(71) Applicant: Richard Michael Mahoney, Los Altos, CA (US)

(72) Inventor: Richard Michael Mahoney, Los Altos, CA (US)

(*) Notice: Subject to any disclaimer, the term of this patent is extended or adjusted under 35 U.S.C. 154(b) by 0 days.

(21) Appl. No.: 14/044,645

(22) Filed: Oct. 2, 2013

(65) Prior Publication Data

US 2014/0094196 A1 Apr. 3, 2014

Related U.S. Application Data

(60) Provisional application No. 61/708,987, filed on Oct. 2, 2012, provisional application No. 61/799,623, filed on Mar. 15, 2013.

(51) Int. Cl.
*H04W 24/00* (2009.01)
*H04W 4/02* (2009.01)
*H04W 4/20* (2009.01)

(52) U.S. Cl.
CPC ............ *H04W 4/02* (2013.01); *H04W 4/206* (2013.01)

(58) Field of Classification Search
CPC ....... H04W 4/02; H04W 64/00; H04W 4/023; H04W 4/14; H04W 4/003; H04W 4/008; H04W 4/185; H04L 29/08657; H04L 29/08108; H04L 29/08936
USPC .............. 455/412.2, 41.2, 456.1–456.3, 466, 455/457–459
See application file for complete search history.

(56) References Cited

U.S. PATENT DOCUMENTS

| | | | |
|---|---|---|---|
| 6,738,628 B1* | 5/2004 | McCall | G01S 1/68 340/8.1 |
| 9,204,257 B1* | 12/2015 | Mendelson | G08G 1/14 |
| 2002/0077060 A1* | 6/2002 | Lehikoinen | G06Q 30/0241 455/41.2 |
| 2003/0130987 A1* | 7/2003 | Edlund | G06F 17/30241 |
| 2004/0162059 A1* | 8/2004 | Hiltunen et al. | 455/412.1 |
| 2004/0198397 A1* | 10/2004 | Weiss | H04W 4/02 455/456.5 |
| 2007/0293143 A1* | 12/2007 | Harris | 455/3.01 |
| 2008/0162206 A1* | 7/2008 | Mak | G06Q 30/0255 705/14.53 |

(Continued)

*Primary Examiner* — Keith Fang
*Assistant Examiner* — B. M. M Hannan
(74) *Attorney, Agent, or Firm* — Wilmer Cutler Pickering Hale and Dorr LLP

(57) ABSTRACT

Techniques for providing and using a text beacon are disclosed. In one particular embodiment, the techniques may be realized as a method comprising the steps of receiving a communication from an initiating client device to initiate a beacon, the communication designating at least one recipient for the beacon and at least one trigger condition for the beacon; sending a communication to a recipient client device associated with the at least one designated recipient, the communication designating the initiating client device; receiving a request for location information associated with the beacon; determining that the request for location information matches the at least one trigger condition for the beacon; and responding to the request for location information by sending position information, based at least on determining that the request matches the trigger conditions for the beacon.

16 Claims, 13 Drawing Sheets

(56) References Cited

U.S. PATENT DOCUMENTS

| | | | |
|---|---|---|---|
| 2009/0088183 A1* | 4/2009 | Piersol | G01C 21/206 |
| | | | 455/456.1 |
| 2009/0322521 A1* | 12/2009 | Jacobson | 340/540 |
| 2010/0283679 A1* | 11/2010 | Levy et al. | 342/357.49 |
| 2011/0087887 A1* | 4/2011 | Luft | H04L 9/3247 |
| | | | 713/178 |
| 2012/0052870 A1* | 3/2012 | Habicher | H04W 8/16 |
| | | | 455/456.1 |
| 2012/0129545 A1* | 5/2012 | Hodis | G01S 5/0257 |
| | | | 455/456.1 |
| 2012/0165035 A1* | 6/2012 | Chen et al. | 455/456.1 |
| 2012/0235812 A1* | 9/2012 | Maia | G01S 13/08 |
| | | | 340/539.13 |
| 2012/0309423 A1* | 12/2012 | Jeon | 455/456.2 |
| 2013/0281084 A1* | 10/2013 | Batada | H04W 4/008 |
| | | | 455/426.1 |

* cited by examiner

Fig. 1

| txtbkn *100* |
|---|
| txtbkn ID |
| Sender ID |
| Recipient ID List |
| Lock type |
| Timestamp |
| txtbkn location |
| Tracking type |
| Trigger conditions |
| Message |

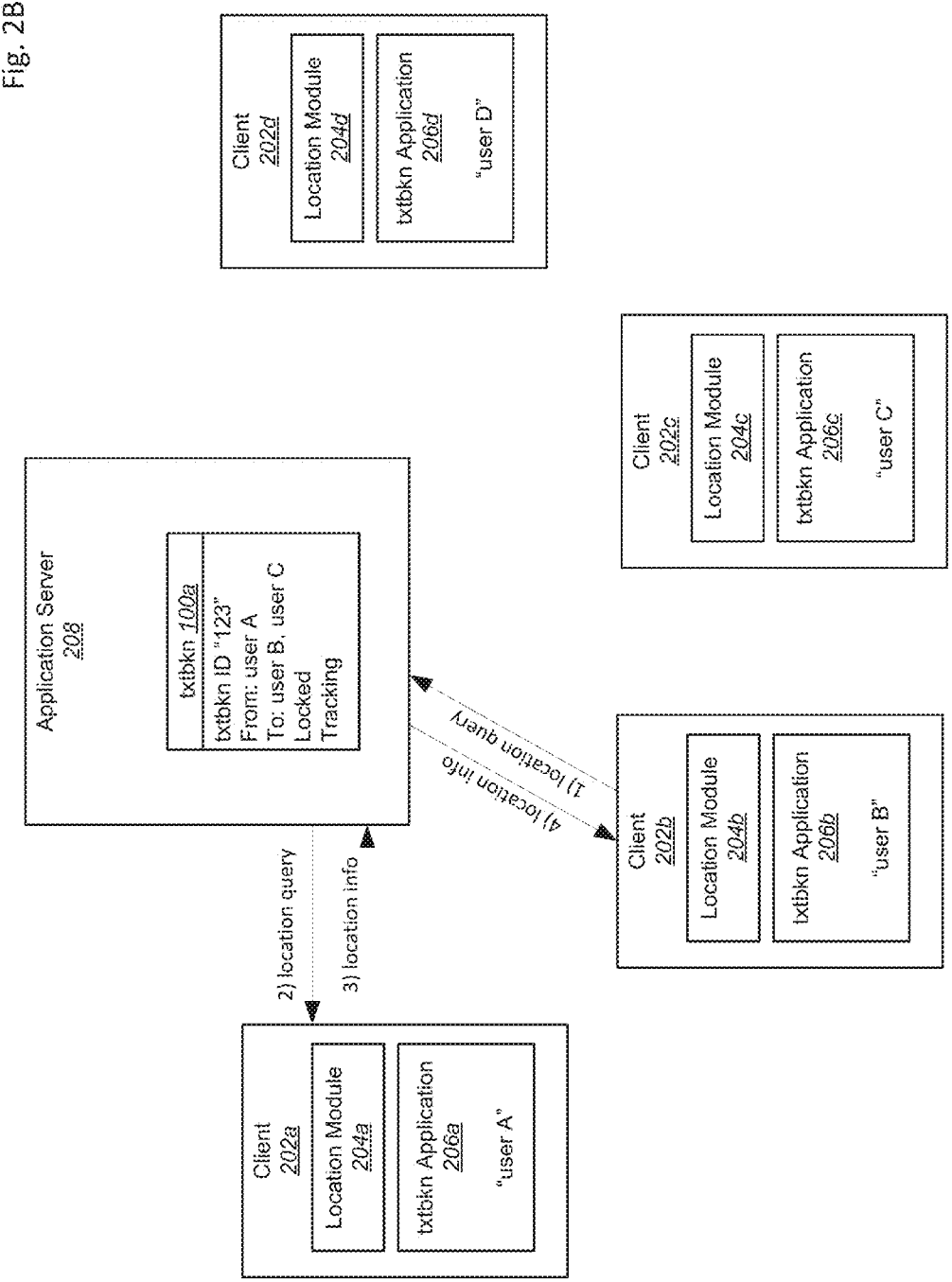

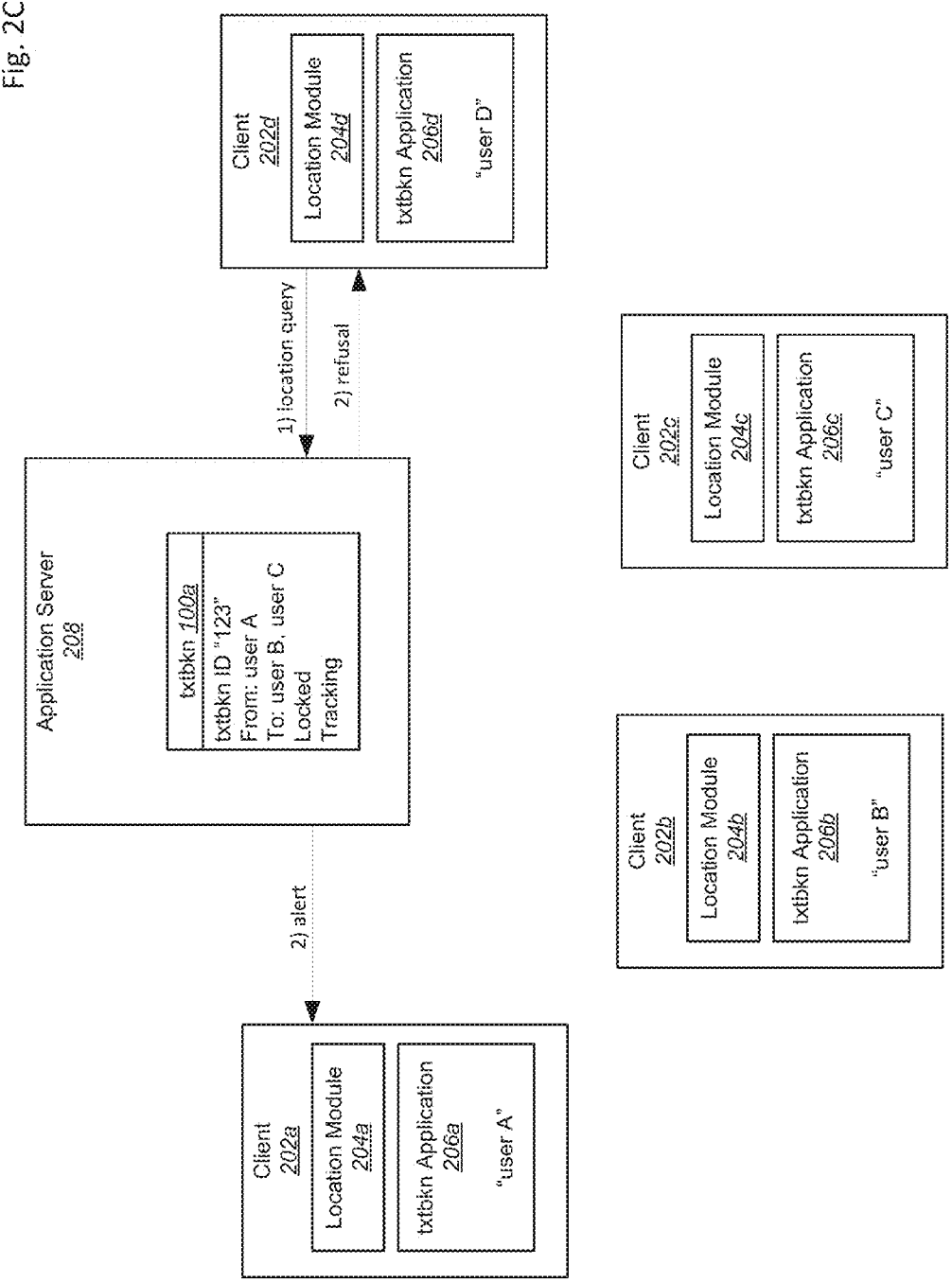

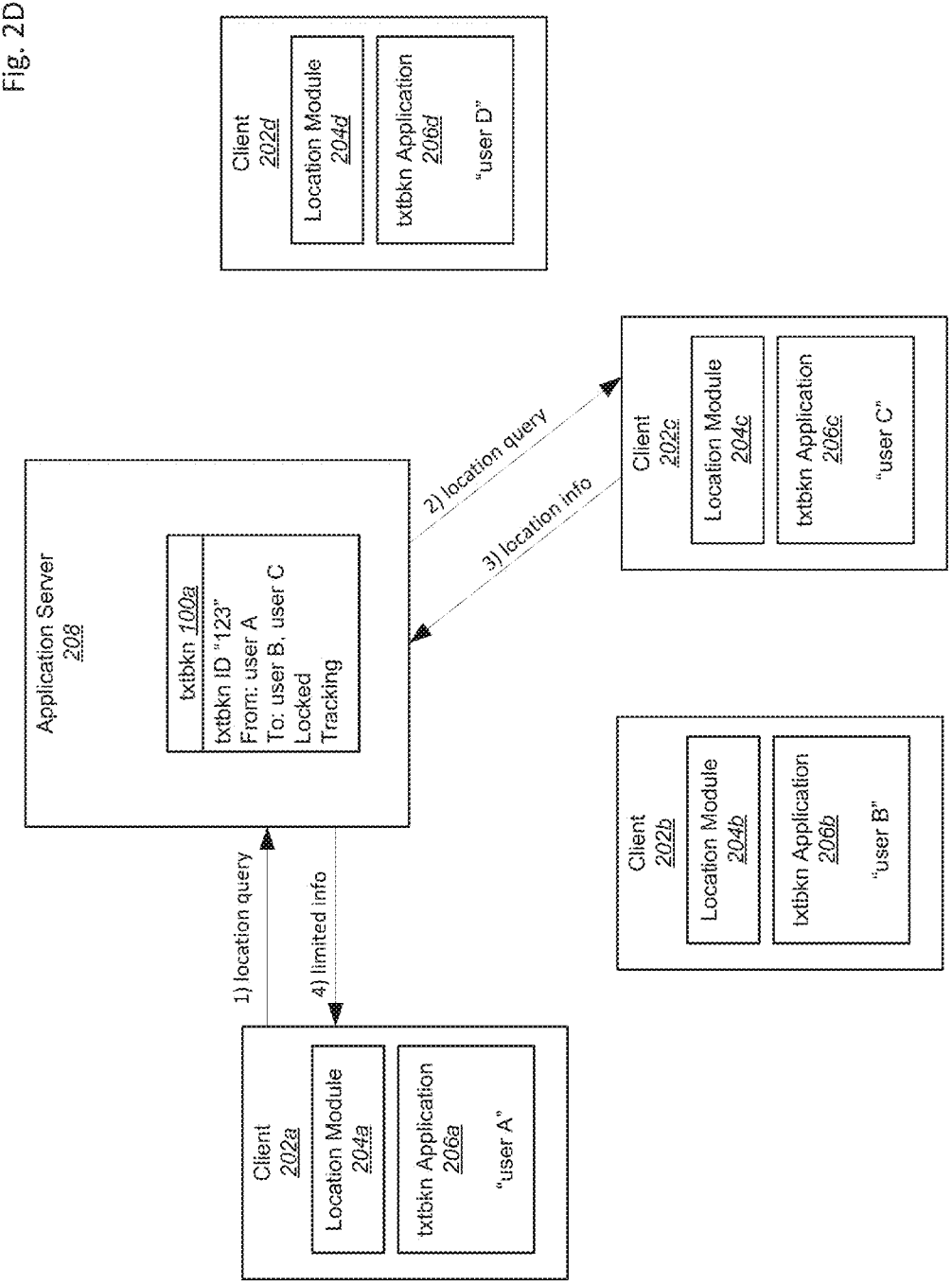

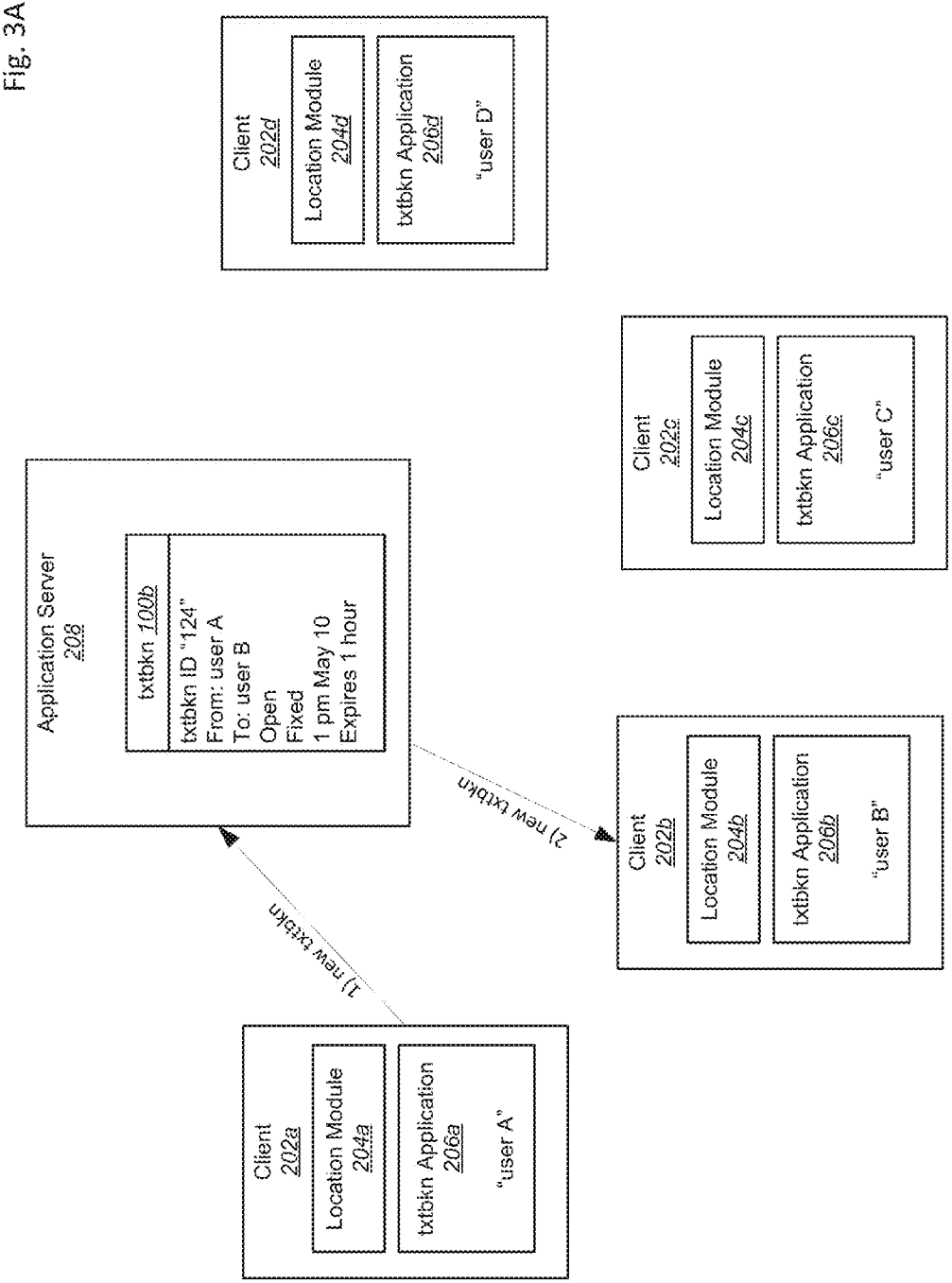

Fig. 6

SYSTEMS AND METHODS FOR PROVIDING TEXT BEACONS

CROSS-REFERENCE TO RELATED APPLICATIONS

This application claims priority to U.S. Provisional Patent Application No. 61/708,987, "Systems and Methods for Providing Text Beacons," filed Oct. 2, 2012, which is hereby expressly incorporated by reference herein in its entirety. This application claims priority to U.S. Provisional Patent Application No. 61/799,623, "Systems and Methods for Providing Text Beacons," filed Mar. 15, 2013, which is hereby expressly incorporated by reference herein in its entirety.

FIELD OF THE DISCLOSURE

The present disclosure relates generally to mobile device applications, and more particularly to location-based mobile device applications.

BACKGROUND

Today's mobile devices provide location and communication features, which are often used by individuals to coordinate meeting and event locations. However, using these features can often require significant manual coordination and effort between devices. Using traditional mapping and messaging applications ("apps") to coordinate may require sending multiple text messages with updates in meeting location and time. A change in destination address requires another message with the address, which the recipient may then be required to enter into their mapping software and provide an updated estimate of arrival time. This coordination process may be clunky and laborious for consumers.

SUMMARY

Techniques for providing and using a text beacon are disclosed. In one particular embodiment, the techniques may be realized as a method comprising the steps of receiving a communication from an initiating client device to initiate a beacon, the communication designating at least one recipient for the beacon and at least one trigger condition for the beacon; sending a communication to a recipient client device associated with the at least one designated recipient, the communication designating the initiating client device; receiving a request for location information associated with the beacon; determining that the request for location information matches the at least one trigger condition for the beacon; and responding to the request for location information by sending position information, based at least on determining that the request matches the trigger conditions for the beacon.

In accordance with other aspects of this particular embodiment, the communication from the initiating client device to initiate the beacon may restrict the beacon to the at least one designated recipient. Sending the location information may be based on determining that the request is sent from a client device associated with the at least one designated recipient.

In accordance with further aspects of this particular embodiment, the method may also include the steps of receiving a second request for location information associated with the beacon; determining that the second request is not sent from a client device associated with the at least one designated recipient; and determining not to respond to the second request by sending location information based on determining that the second request is not sent from a client device associated with the at least one designated recipient.

In accordance with other aspects of this particular embodiment, the communication from the initiating client device to initiate the beacon further includes tracking settings for the beacon. The method may further include the steps of determining that the tracking settings for the beacon include updating the location of the beacon; after receiving a request for location information associated with the beacon, based on determining that the tracking settings for the beacon include updating the location of the beacon, sending a request for updated location information to the initiating client device; and after sending the request to the initiating client device, receiving updated location information from the initiating client device. The location information sent in response to the request for location information associated with the beacon may be the updated location information.

In accordance with other aspects of this particular embodiment, the method may further include the steps of receiving a request from the initiating client device for location information about a recipient of the at least one designated recipient; sending a request to the recipient client device for location information about the recipient; receiving first location information from the recipient client device in response to the request to the recipient client device; and sending second location information to the initiating client device in response to the request from the initiating client device, wherein the second location information is different from the first location information.

In accordance with further aspects of this particular embodiment, the first location information may include position coordinates of the recipient client device. The second location information may include at least one of a time, distance, or duration based on the first location information but does not include the position coordinates of the recipient client device.

In accordance with further aspects of this particular embodiment, the method may further include the step of receiving a communication from the recipient client device indicating what location information about the recipient to include with the beacon. The second location information sent to the initiating client device in response to the request from the initiating client device may be based on the communication from the recipient client device indicating what location information about the recipient to include with the beacon.

In accordance with other aspects of this particular embodiment, the at least one trigger condition may include a time condition. Determining that the request for location information matches the at least one trigger condition for the beacon may include determining that the time of the request satisfies the time condition.

In accordance with further aspects of this particular embodiment, the time condition may include at least one of a specified time at which the beacon will become active, a specified time at which the beacon will no longer be active, and a duration of time after which the beacon will become inactive.

In accordance with other aspects of this particular embodiment, the at least one trigger condition may include a location condition. Determining that the request for location information matches the at least one trigger condition for the beacon may include determining that location information for the recipient client device satisfies the location condition.

In accordance with further aspects of this particular embodiment, the location condition may be that the location information for the recipient client device represents a different location from location information associated with the beacon.

In accordance with other aspects of this particular embodiment, the communication sent to the recipient client device may be a beacon file including information about the beacon.

In accordance with other aspects of this particular embodiment, the communication sent to the recipient client device may include a unique identifier associated with the beacon. The request for location information associated with the beacon may include the unique identifier associated with the beacon. The method may further include the step of using the unique identifier to retrieve information regarding the beacon from a list including the information for a plurality of beacons.

In accordance with other aspects of this particular embodiment, the techniques may be realized as at least one non-transitory processor readable storage medium storing a computer program of instructions configured to be readable by at least one processor for instructing the at least one processor to execute a computer process for performing a method of one of the embodiments.

In accordance with other aspects of this particular embodiment, the techniques may be realized as an article of manufacture including at least one processor readable storage medium and instructions stored on the at least one medium, wherein the instructions are configured to be readable from the at least one medium by at least one processor and thereby cause the at least one processor to operate so as to perform a method of one of the embodiments.

In accordance with other aspects of this particular embodiment, the techniques may be realized as a system including one or more processors communicatively coupled to a network; wherein the one or more processors are configured to perform a method of one of the embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

FIG. 1 illustrates an example of a txtbkn data structure in accordance with one embodiment of the present disclosure.

FIGS. 2A-2D illustrate communication associated with a locked txtbkn in accordance with one embodiment of the present disclosure.

FIGS. 3A-3C illustrate communication associated with a txtbkn having a time-based trigger condition in accordance with one embodiment of the present disclosure.

FIG. 6 is a list of data elements associated with various structures that may be included in one implementation of the present disclosure.

DETAILED DESCRIPTION

Figure 2A:
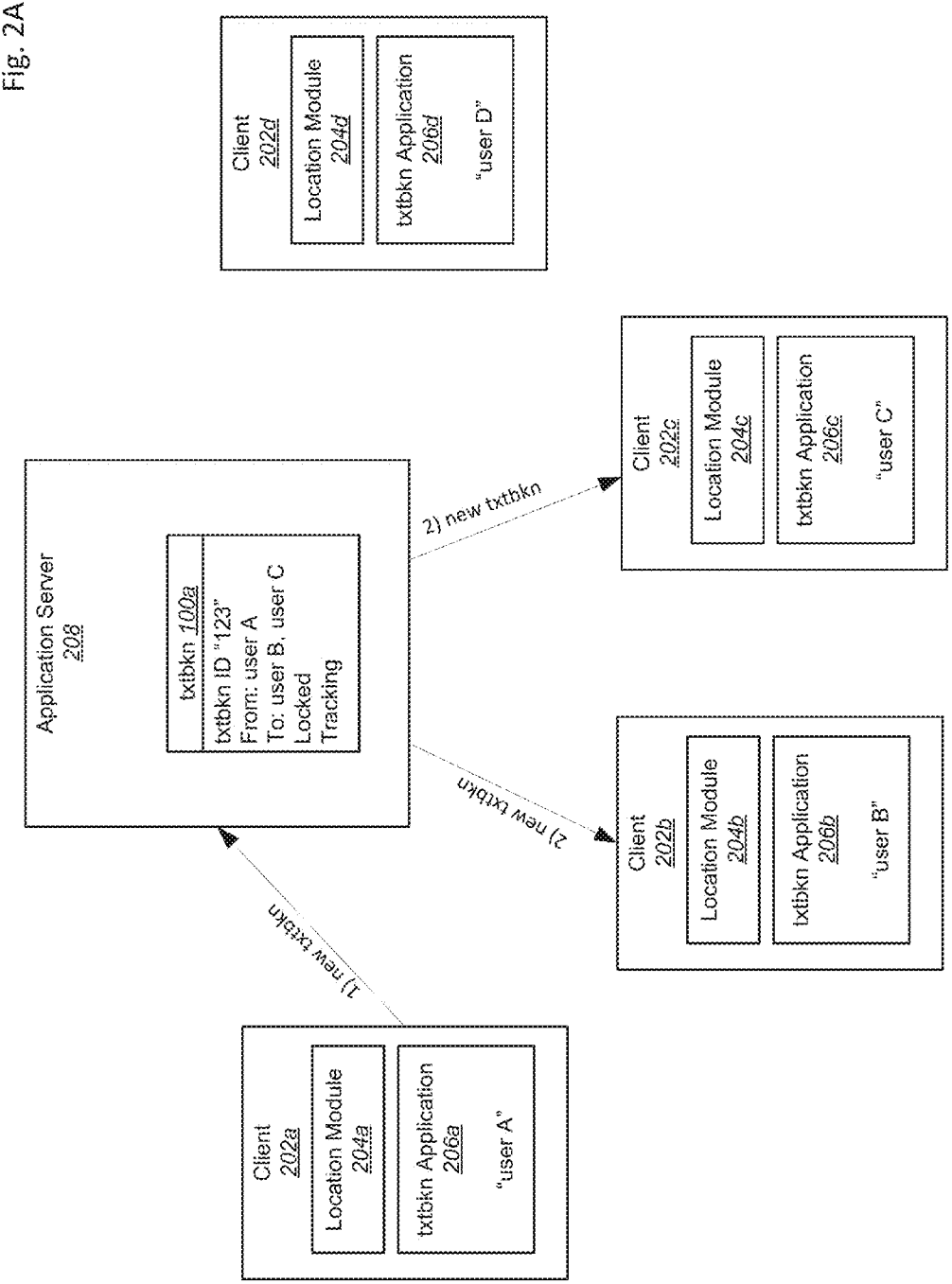

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

In general, a text beacon or txtbkn[1] is a new form of communication modality/application for mobile devices that is characterized by an ease of use and simplicity that is similar to text messaging, but creates a unique dynamic reference to the location information of the Sender, with other special features described below, as the basis for the interaction between the Sender and the Recipients of the txtbkn.

[1] The terms "text beacon," "txtbkn," "beacon," and "bkn" are used interchangeably throughout this application. The terminology is not intended to be limiting to any specific implementation described herein, and other descriptive terms may be used.

Once a unique txtbkn is communicated/transmitted between the Sender and the Recipient, the txtbkn application provides updates on the arrival time of the Recipient, and other notices/functions that usually require numerous communications between two people when they are planning to meet. Individual txtbkns let the Sender and Recipient easily share information about their relative status with respect to the txtbkn location, in a way that is independent of mapping software and can be independent of showing either's exact location.

txtbkns are a 'platform technology' from the perspective that the definition of the txtbkn structure creates a mechanism that can form the basis of many types of applications. Besides basic communication between individuals, txtbkns can be used for advertising campaigns, tracking many kinds of behavior related to people's movement habits, and many new applications to be defined.

FIG. 1 shows the data elements associated with a txtbkn 100 in accordance with one implementation of the present disclosure. A txtbkn may be defined by a standard data structure, the primary contents of which are the location coordinates of the mobile device specified by the Sender of the txtbkn. In some implementations, the information for a txtbkn may be included in a file which may be sent or received on different devices. For further examples of data elements which may be associated with a txtbkn and with systems for managing and using txtbkns, see FIG. 6.

As shown in FIG. 1, each txtbkn 100 may include any of the following parameters:

Unique txtbkn ID number. Each txtbkn may be identified by a unique identifier, which may be assigned by an application server. In some implementations, the textbkn identifier itself may be sufficient information to query the server for additional information regarding the txtbkn, although whether the query is successful may depend on the txtbk's lock type.

Sender ID. The txtbkn includes information identifying the sender. The "sender," in this case, refers to the individual or device responsible for initiating the txtbkn, and who in some implementations has subsequent control over the parameters and settings of the txtbkn. Each sender ID may be uniquely generated or may be based on contact information for the sender, such as a device phone number or email address. An account user name associated with a txtbkn service may also serve as a sender ID.

Recipient ID list. One or more recipients may be explicitly designated by the sender to initially receive the txtbkn. These recipients may be designated by contact information such as phone number or email address, or by account username on a txtbkn service. In some implementations, information regarding a txtbkn may appear on a txtbkn list on client devices associated with each recipient.

Lock type. In some implementations, the sender may specify whether to limit use of the txtbkn to the recipient ID list or another list of authorized users. A "locked" txtbkn may be limited to only authorized parties, while an "open" txtbkn may treat anyone who responds to the txtbkn as a recipient. In some implementations, how a txtbkn server responds to a client device's request for information associated with a txtbkn may depend both on an identity associated with a client device and the txtbkn's lock type.

Timestamp. The date and time that a txtbkn is first initiated may be important both for sorting multiple txtbkns and for determining whether a txtbkn is current or expired. In some implementations, there may be a default expiration and deletion from a txtbkn server and from txtbkn applications of txtbkns older than a certain age.

txtbkn location and Tracking type. A txtbkn may either be "fixed" or "tracking." A fixed txtbkn has a fixed bkn location; any authorized request for the txtbkn's location will return this location. At any point, a tracking txtbkn's current bkn location is the current location of the sender's mobile device. In some implementations, a txtbkn application may interface with GPS or other location functionality on a mobile device in order to determine and communicate location information to authorized recipients.

Trigger conditions. In some implementations, a txtbkn may only be active for a specified window of time or when one or more other conditions is true. When initiating a txtbkn, the sender may set one or more conditions which determine when a request for information associated with the txtbkn will return that information. A variety of trigger conditions may be set. For example, a condition may be set that the txtbkn will remain active for the current day, or only for a set period of time. Additionally, a txtbkn may be set to expire when one or more recipients are determined to be in the same location as the sender (this is shown on the display 400 as "arrival"). In some implementations, a txtbkn may not be active when it is first sent, but the trigger conditions may be set to activate the txtbkn at a later time. For example, a txtbkn for a future event could be sent that only becomes active an hour before the event is scheduled and includes the location of the event.

Message. In some implementations, the sender may include text that will be associated with the txtbkn and seen by recipients of the txtbkn.

FIG. 2A illustrates communications associated with a locked txtbkn in accordance with one embodiment of the present disclosure. A client device 202a includes a location module 204a and a txtbkn application 206a which communicates with an application server 208. The application server 208 is responsible for maintaining multiple txtbkns 100 and managing txtbkn communications and services.

The client device is associated with "user A" and initiates a particular txtbkn 100a with unique bkn ID "123." As shown in FIG. 2, the txtbkn "123" is a tracking txtbkn with recipients "user B" and "user C" and is locked. Other settings and information associated with this particular txtbkn 100a represented by unique bkn ID "123" are not shown.

Additional client devices 202b-d also include location modules 204b-d and txtbkn applications 206b-d respectively. Each of the txtbkn applications 206b-d is also in communication with the application server 208 for use and management of txtbkns. Because client devices 202b and 202c are associated with "user B" and "user C" respectively, the application server 208 sends information to each of these two client devices 202b and 202c regarding the txtbkn 100a with unique bkn ID "123."

In FIG. 2B, the client device 202b queries the server 208 for the location associated with the txtbkn 100a with unique bkn ID "123." Because the client device 202b is associated with the recipient "user B," (and assuming that any trigger conditions are currently met as further described below) the application server 208 is authorized to report the bkn location to the client device 202b. Because the txtbkn 100a is a tracking bkn, the bkn location is the current location of the sender's client device 202a. The server 208 queries the device 202a for its current location, which may return a location using the location module 204a. That location may then be communicated by the server 208 to the recipient device 204b.

In FIG. 2C, the client device 202d queries the server 208 for the location associated with the txtbkn 100a. The txtbkn 100a is set as a locked bkn, and "user D" is not on the recipient list. Therefore, the application server 208 denies the request for the location information. In some implementations, the application server 208 may alert "user A" to the unauthorized request, possibly through the txtbkn application 206a, and may allow the "user A" to add "user D" to the recipient list (which would cause the application server 208 to respond to further requests from the device 202d for the location of the txtbkn 100a). The application server 208 may also send a communication to "user D," possibly through the txtbkn application 206d, explaining the failure of the attempt to use the txtbkn 100a.

In FIG. 2D, "user C" associated with client device 202c has accepted the txtbkn 100a through use of the txtbkn application 206c. Subsequently, the sending device 202a sends a query to the application server 208 for location information associated with "user C." The application server 208 queries the client device 202c associated with "user C," which replies with location information from the location module 204c.

In some embodiments, actual position coordinates for a recipient may not be relayed to the sender. Instead, the application server 208 may relay more general information about the recipient's location. As shown in FIG. 2D, the server relays a distance and estimate time of arrival to the sending device 202a. In some implementations, this information may be automatically retrieved and updated for the use of the sender.

FIG. 3A demonstrates the use of a txtbkn 100b, bkn ID "124," with a time-based trigger condition. The txtbkn 100b is a fixed txtbkn with a timestamp of 1 pm on May 10, and includes a trigger condition that activates immediately and expires after 1 hour. The txtbkn 100b is initiated by the client device 202a associated with "user A" and is originally sent to the recipient device 202b associated with "user B," but the txtbkn 100b is open such that requests for the txtbkn information are not limited to the recipients list.

Figure 3B:
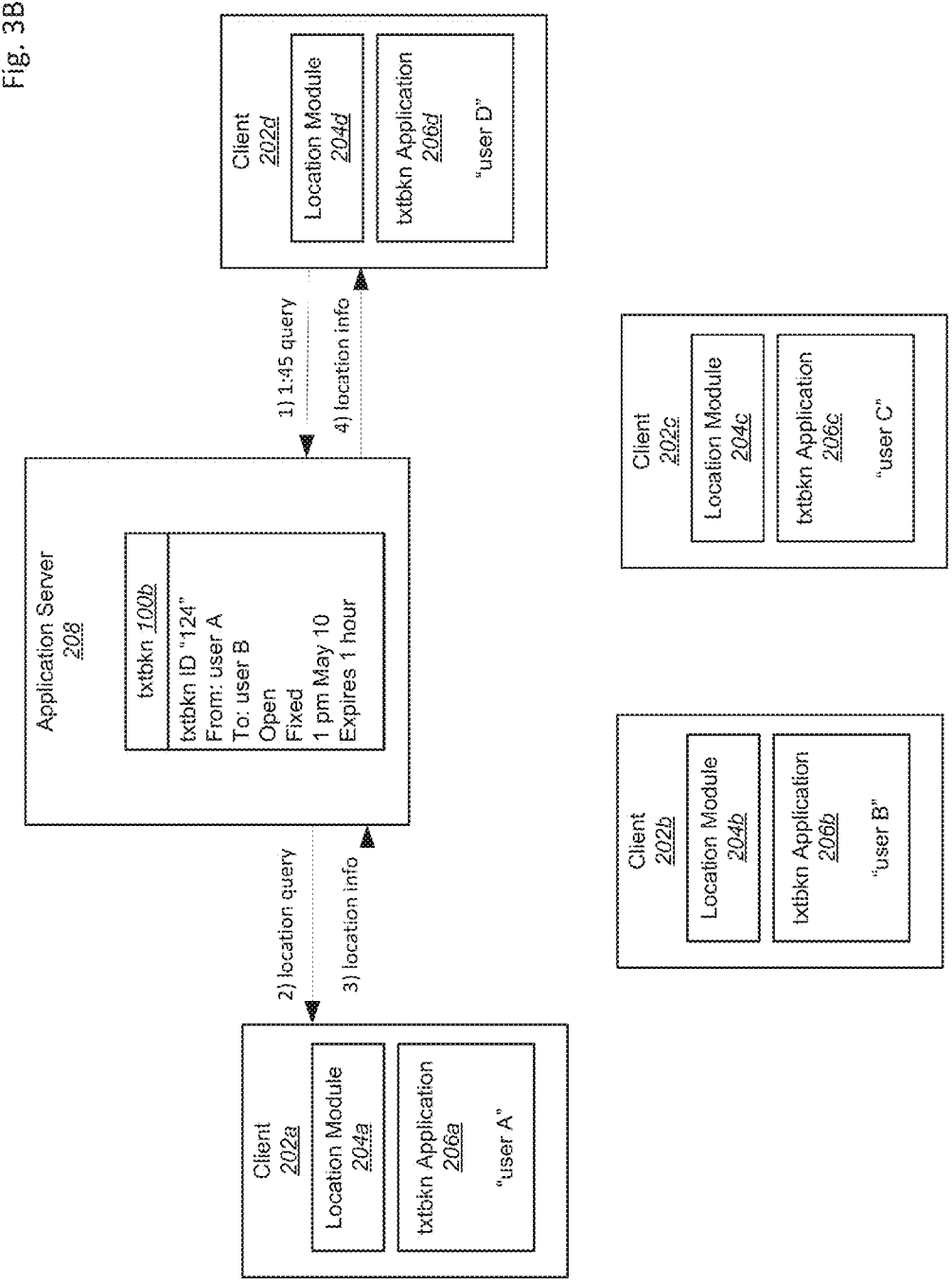

In FIG. 3B, the client device 202d queries the server 208 for the location associated with the txtbkn 100b. The query is sent at 1:45 pm on May 10. According to the trigger conditions the txtbkn 100b is still active, so the fixed location associated with the txtbkn 100b is sent to the client device 202d.

Figure 3C:
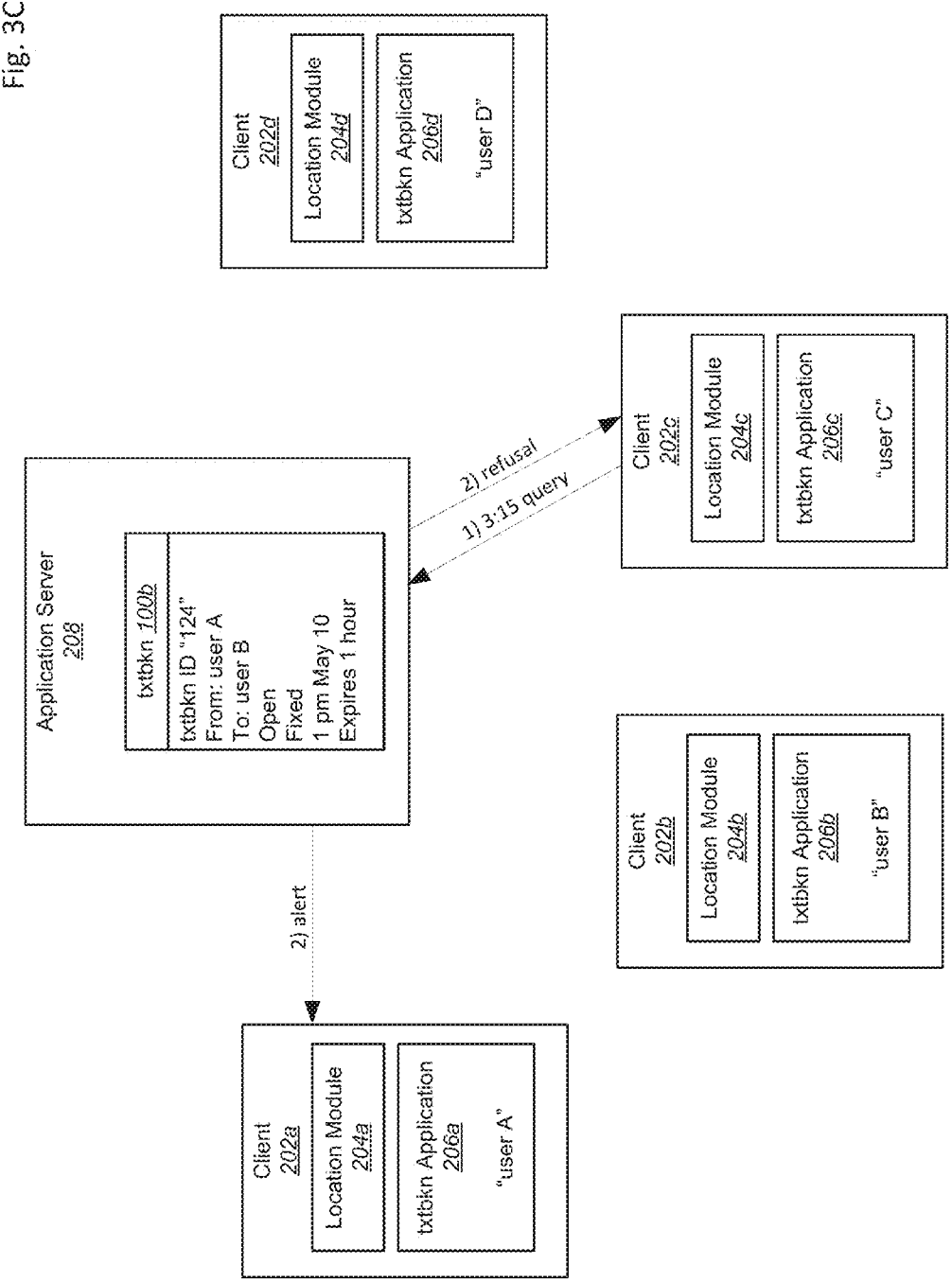

In FIG. 3C, the client device 202c queries the server 208 for the location associated with the txtbkn 100b. The query is sent at 3:15 pm on May 10. According to the trigger conditions the txtbkn is no longer active, so the application server 208 does not respond with the fixed location of the txtbkn 100b. In some implementations, a communication may be sent to the client device 202c, possibly through the application 206c, explaining that the txtbkn is inactive.

Figure 4A:
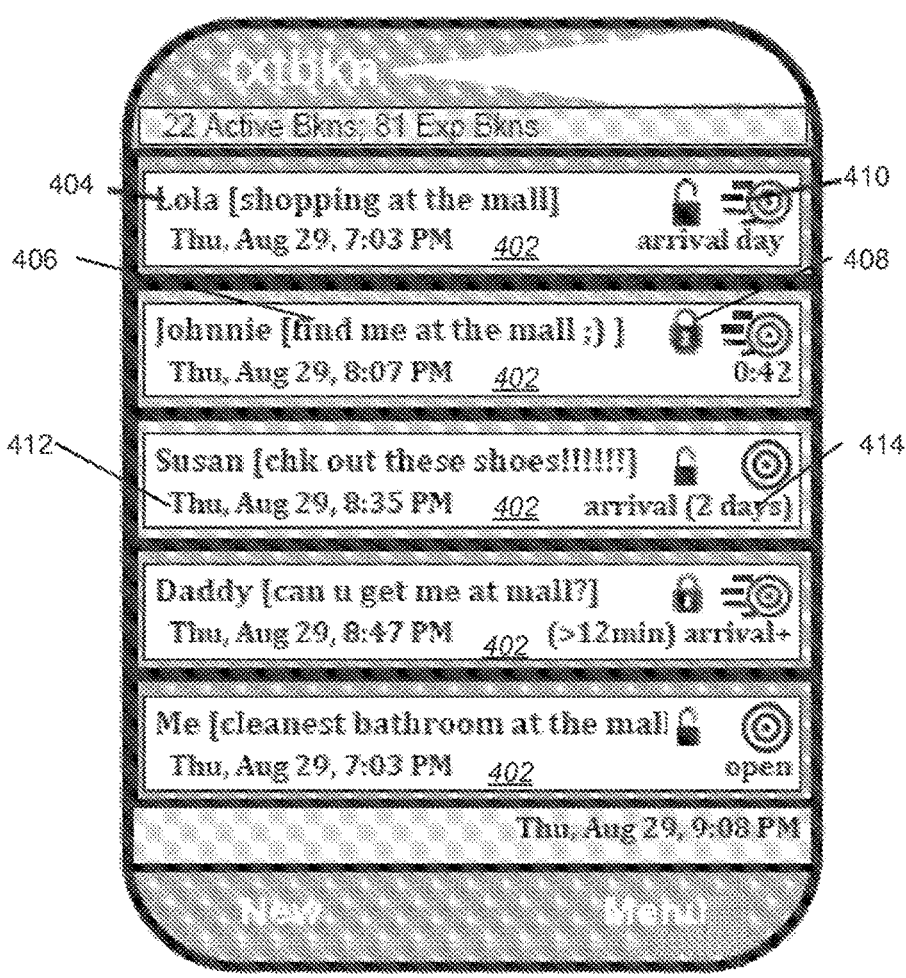
FIGS. 4A-4C show an exemplary display for a txtbkn mobile application in accordance with an embodiment of the present disclosure.

FIG. 4A illustrates one implementation of a display 400 for a txtbkn application in accordance with the present disclosure. The display 400 shows a list of txtbkns sent by a user. Each entry 402 shows a recipient 404; a message 406 sent along with the text bkn; icons 408, 410; a time stamp 412; and arrival status 414.

The display 400 shows the names of recipients 404, which may be based on a contact list associated with the txtbkn application or another application associated with the mobile device such as the device's contact list.

The icon 408 indicates whether the txtbkn is locked to only the recipients. Open txtbkns may be accessed by any client device, while locked txtbkns may only be accessed by client devices associated with listed recipients. In some implementations of a txtbkn application, the application may allow a user to forward received txtbkns to additional recipients. This forwarding capability may be disabled for locked txtbkns, or alternatively a user attempting to forward a locked txtbkn may receive an alert reminding the user that the new recipient may not be able to use the txtbkn.

The icon 410 indicates whether the txtbkn is fixed or tracking. As described above, fixed txtbkns return a particular location set for the txtbkn, while tracking locations return the current location of a client device associated with the sender.

The arrival status 414 may give an estimate for when the recipient is expected to arrive based on the recipient's present location and velocity. In some implementations, each entry 402 may also have a frame that displays a different color based on the recipient's status with respect to the txtbkn (grey for not approaching, yellow for approaching, and green for arrival).

Figure 4B:
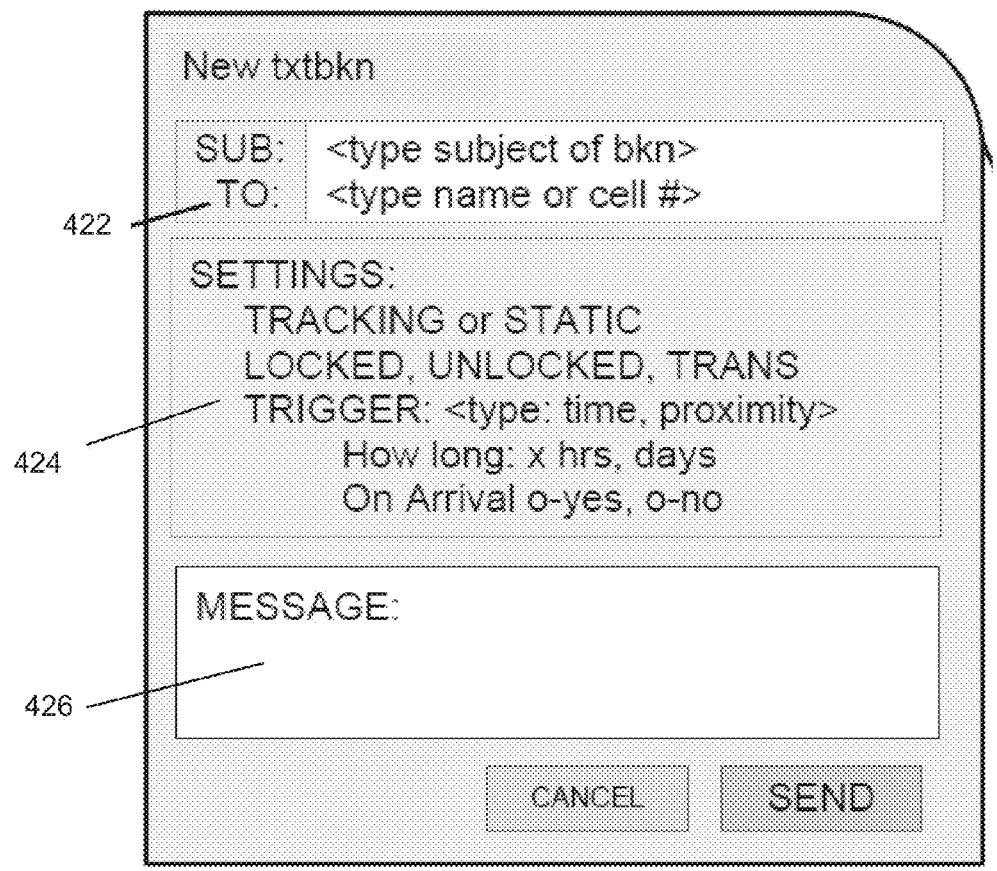

As shown in FIG. 4B, hen the user initiates a new txtbkn by selecting "New" on the display 400, a new txtbkn creation page 420 may be displayed. The creation page 420 may include a field 422 for entering a subject and recipients for the txtbkn. A settings field 424 may allow the sender to choose settings for the txtbkn as well as set trigger conditions. Further, a message field 426 may allow a user to enter a message to associate with the txtbkn, which in some implementations may have similar text entry capabilities and capacity to SMS or other text messaging protocol.

Figure 4C:
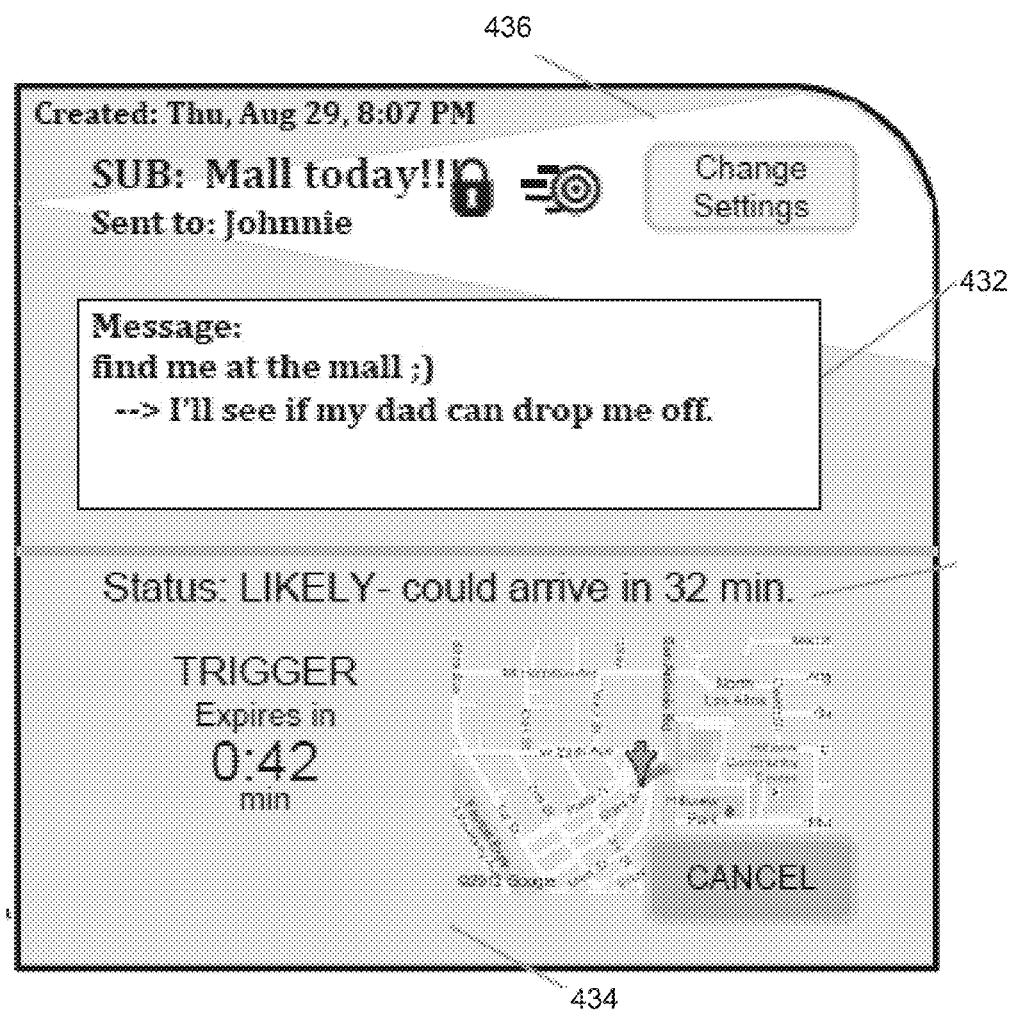

As shown in FIG. 4C, selecting a particular entry 402 on the display 400 may cause a txtbkn details page 430 to be displayed. The details page 430 may include messaging window 432 where the original message associated with the txtbkn may be displayed. In some implementations, the sender and the recipient may add additional messages to the txtbkn, allowing for communication between parties related to the txtbkn.

The details page 430 may further include a status window 434, which may include a likely arrival time of a recipient, show a map of the txtbkn location, and show trigger information for the txtbkn. In some implementations, the user may be able to further adjust the triggers and txtbkn type from this details page 430, possibly by means of a settings button 436.

Figure 5:
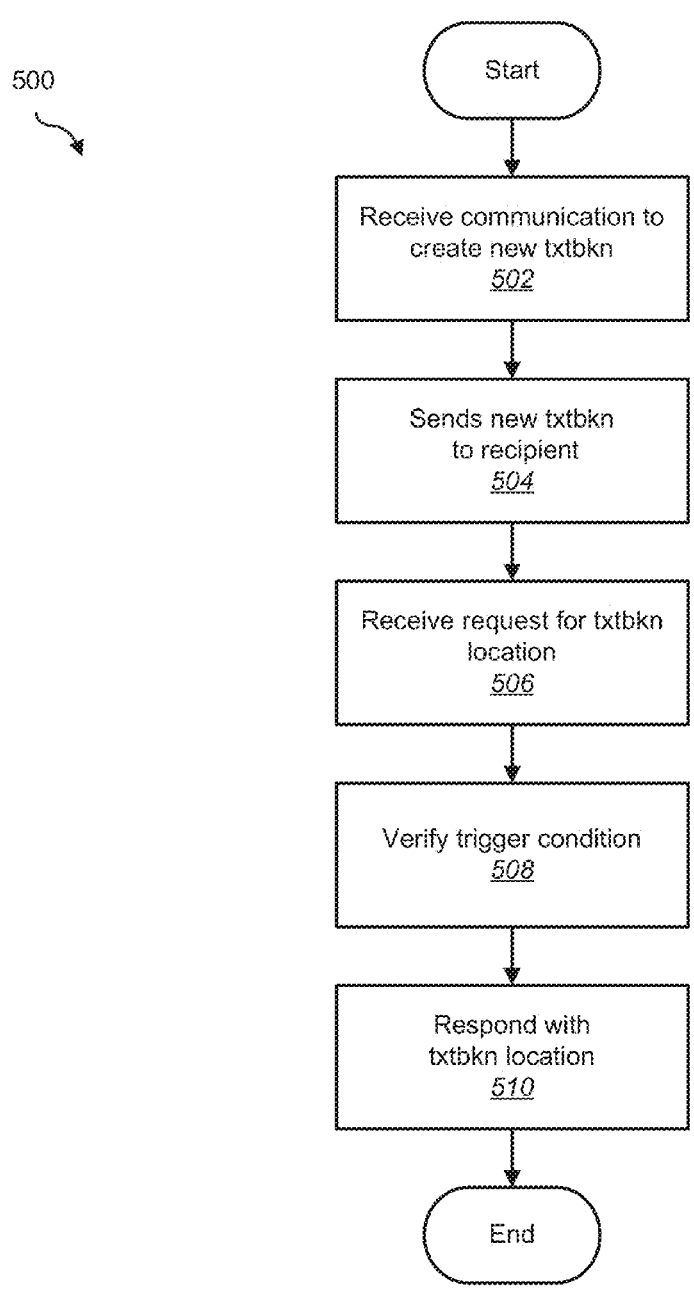
FIG. 5 shows a method of creating and using a txtbkn in accordance with an embodiment of the present disclosure.

FIG. 5 is a flow chart illustrating a method 500 for creating a txtbkn in accordance with one embodiment of the present disclosure. In some implementations, the steps of the method 500 may be performed by an application server such as the application server 208 illustrated in FIGS. 2A-3C above.

A communication is received to create a new txtbkn (502). This communication may include various information involving the settings of the new txtbkn, may include information designating the senders and receivers of the txtbkn, may include one or more trigger conditions indicating when the txtbkn is active. If the txtbkn is designated as "fixed," then the communication may further include location information to associate with the txtbkn. If the communication is received by an application server, the application server may add information on the newly created txtbkn to a repository including other txtbkn information that the server is responsible for managing.

The new txtbkn is sent to one or more listed recipients (504). In some implementations, this function may be performed by an application server. A client device associated with the sender of the txtbkn may also send a txtbkn, such as in the form of a file including the appropriate information, to one or more recipient through a channel such as MMS or email.

A request for the location associated with the txtbkn is received (506). This request may be sent to the application server or other centralized system that is responsible for managing the txtbkns 506; alternatively, the request may be sent directly or indirectly to a device associated with the sender of the txtbkn.

One or more of the txtbkn's trigger conditions are verified to determine that the txtbkn is active (508). As described above, trigger conditions may be time-based or location-based and may be set by the sender of the txtbkn. The system determines that all applicable trigger conditions are met, so that the txtbkn is active and should report a location to authorized devices (which in some cases, such as for an open txtbkn, may be any devices, while in other cases, such as for a locked txtbkn, may be only certain designated devices).

A response to the request is sent, including the txtbkn location (510). The location is given because the trigger conditions are met for the txtbkn to be active. In some implementations, additional conditions (such as a user identity associated with the requesting device) may also have been necessarily met before the txtbkn location would be given.

As described above, depending on the txtbkn settings, additional steps may be performed before the response can be sent. For example, if the txtbkn is a tracking txtbkn, a current location of a device associated with the sender may have to be determined, since the sender's current location should be reported as the txtbkn location. In other cases, such as when the txtbkn is fixed, a location can be given without consulting the sender's device.

Figure 6:
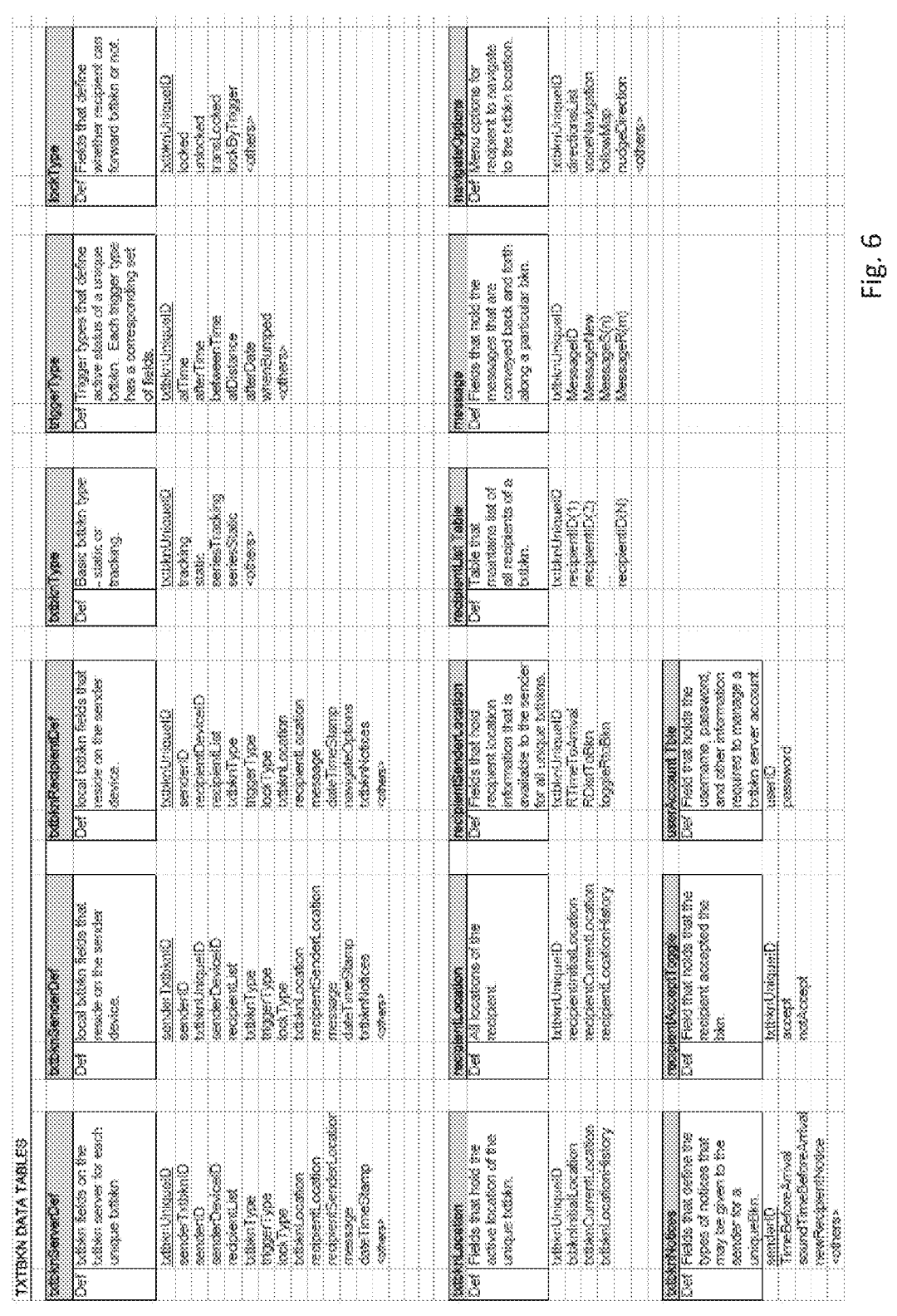

FIG. 6 is a list of data elements associated with various structures that may be included in one implementation of the present disclosure. One of ordinary skill in the art will recognize that not all of these data elements will necessarily be included in every embodiment of the txtbkn and that adding additional data elements may still remain within the scope of the present disclosure.

The txtbknServerDef data table may include the txtbkn fields that are used by a txtbkn server to manage and administer txtbkns and communicate with sender and recipient devices. The txtbknSenderDef may represent the information used by the sender's device app to manage the interaction of the sender with unique txtbkns, while the txtbknRecipientDef may represent the information required for the recipient to interact with received txtbkns.

The txtbknUniqueID is the unique ID created by the txtbkn server and used as the main reference for a txtbkn. This is different senderTxtbknID, which is the unique txtbkn ID created by the sender when the txrbkn is first sent to the bknserver. In some embodiments, the sender may continue to use the sender's txtbkn ID while both the server and any recipients use the unique ID created by the server.

The senderID is identifier used for the sender, which may be an application account name, while the senderDeviceID is the cell phone, IP address, or other indicator of the sender's device.

The recipientList is the list of people who receive the txtbkn. This may include both original single recipients and, in the case of open txtbkns, anyone to whom the txtbkn has been forwarded.

As described above, the txtbknType, triggerType, and lockType are settings for the txtbkn that determine when the txtbkn is active, whether the txtbkn location moves with the sender, and whether the txtbkn can be forwarded.

The txtbknLocation field may hold both current location information and, in the case of tracking txtbkns, also a history of past locations.

In some implementations, where the position of the recipient may often not be available to the sender, there may be separate fields for recipientLocation (which may include current and past location information for the recipient) and recipientSenderLocation, which includes only the location information made available to the sender.

Applications on client devices may further include a txtbknNotices field for storing information used by the application on that device to send notices to the user about the unique txtbkn, such as a notice when the recipient arrives or is approaching the txtbkn.

For txtbkns where a particular device is a recipient, a navigateOptions field may also store the active method chosen by the recipient to navigate to the txtbkn.

Use Cases

Communication through exchange of a txtbkn creates a very simple means to coordinate. For example, consider the following scenario of two people meeting for lunch.

"I'll send you a txtbkn when I choose a restaurant." S (the sender) reaches the location and sends a txtbkn to the cell phone of R (the recipient), the person they are meeting. The txtbkn is set up to expire at 1 pm. R gets the txtbkn, and uses the menu for the txtbkn to choose directions and to see his expected arrival time. When the txtbkn is received, the txtbkn server calculates navigation information about R's location. S receives a regular update on the expected arrival time of R (but does not know exactly where R is). S's cell phone buzzes when R is 5 min away. At 1 pm, after they met up, the txtbkn automatically expired and the location information for S is no longer updated to the unique txtbkn data file or available to R.

Note that a preferred feature of the txtbkn application is that the exact location of R is never reported, only features of R's location related to tracking the txtbkn. For instance, the txtbkn would report that R could arrive at the txtbkn in X minutes. If R was going to the txtbkn right now, X would be the quickest he or she would arrive. No information on R's exact location would be provided, but S would know relatively how much time before R would arrive. R's would be asked to allow their device location to be used for this function, and R could elect to have his or her location shown for other uses of txtbkns.

In order to go to a txtbkn, R would open the txtbkn and then choose a navigate function from a simple menu, which could include:

show directions
show a map
describe where (Starbuck's on University Avenue)
tell me the directions (voice navigation)

The txtbkn screen could have a drop down menu that shows the directions. The txtbkn software would not necessarily have to have its own navigation engine. It could link to the mapping and navigation resources of the mobile device platform it is on.

Another feature would be arrival notices that would be sent to S. The txtbkn would turn on a green border, or send a notice (sound, buzz, etc.) that R had arrived at the txtbkn, or the strength of the notice (volume, etc) would increase as R neared the txtbkn. There are a few ways this feature could be used. If S is waiting for someone, then txtbkn gives a signal when they will arrive in a few minutes. In another case, S may send a fixed txtbkn about something. The txtbkn notice would be sent when R arrived at the txtbkn, even though S is not there. As an example, S may want R to try out a new coffee shop. S sends the fixed txtbkn to R when they are at the location. When R goes to the coffee shop txtbkn, S gets a notice as a way to know that R saw the coffee shop.

Typically, a txtbkn is either associated with a fixed location, or it is connected to the mobile device of the sender. It is also possible that GPS type tracking capability would be assigned to other types of objects. The txtbkn application could have the ability to have the GPS identifier listed in their mobile device such that S could choose another mobile device and send a txtbkn relative to that device. Under circumstances where appropriate permissions were set up, a father could send a txtbkn for a mother's cell phone to a child, or vice versa. GPS tracking sensors are beginning to become cheaper and more commonplace, and attached to everyday objects. There are a number of applications where this type of capability for txtbkns could become more commonplace as well.

Txtbkns can be associated with certain filters related to what you are tracking. For example, a user could be traveling and then check the "gasbkns" to see if there are any gas stations open nearby. Are there any "restaurantbkns"? The idea is that the txtbkns are on when the restaurant is open, or the txtbkn has live information about what is happening at the location, it can list if there is a long waiting list, it can list menu specials, etc. It is a way to broadcast in real time what is happening at the venue. txbkn analytics would show how many R's are near the resource.

In another implementation, a txtbkn server could be connected to a restaurant's reservation system. The txtbkn could send in real time the availability of tables. In a retail setting, a txtbkn could be connected to the inventory system, and send in real time the current stock of any item.

In some implementations, user can make sequence txtbkns. When a user chooses to create a sequence txtbkn, every time the user sends a txtbkn from that sequence, it marks the spot in order between the previous and the next spot. This can be used to create trails to follow. Someone can retrace steps on a pub crawl, or it can be used to show someone a good running path you found through the city.

In some implementations, a txtbkn cannot be found on an map or other navigation application; it first has to be sent to a given user, who can then access a map reference from the txtbkn app. So, a user can send a text that says, 'please send me a txtbkn so I can find you' or send a txtbkn request from the application. Someone receiving it could accept the request and choose the type of txtbkn to send back. txtbkns can be linked to websites. Instead of writing down an address, a user could click the sendbkn icon and give it a cell number, and the txtbkn is sent to the device for tracking.

For commerce, txtbkns can have 'content' related to store sales, etc. A user can add a coupon to a txtbkn for instance that would only work if you arrive within a certain amount of time. A user would enroll in the store's txtbkn service and they would put you on their approved list. The coupon could have a timer on it that can only be used if you respond to the txtbkn in a certain amount of time.

A coffee shop or restaurant could send out a bkn that tells people what is happening at that time in their shop. The txtbkn could be on all the time with status, or the coffee shop could send out a txtbkn blast saying 'free coffee for the next 15 min' or any number of variations on that theme.

Hotels can have txtbkns attached to them. You could have a scenario where the admin of a business is asked to send the txtbkns for the hotels it usually recommends for its visitors.

On a college or other school campus, when students get their class schedules on line, each class location can have a txtbkn attached to it to help the students find the building and classroom.

Any business can have a feature on its 'contact us' page that when you click on it, it sends you a txtbkn to link you to its location.

For a meeting or appointment, the organizer could send out a meetingbkn, to an individual or a group of individuals. The analytics for the txtbkn would track whether the attendee(s) is(are) arriving on time. S or the R's could be shown the attendance of all the participants.

For a salebkn, a coffee shop can monitor whether their sale offer caused any movement towards their store. If it didn't, it could send out more or change the offer until it got the response it was looking for.

You can also have a racebkn. In this case, someone in any kind of race can send a race txtbkn that tracks his or her location along the race course. Those who sign up to receive the txtbkn, can link to that person's progress. A race organizer could require that all people send out a txtbkn so that the whole race can be monitored. You could imagine enterprise software for managing a racebkn campaign. This same tool can be used to log courses and course records. People could send out a txtbkn to a tracking site that will log that they followed a route and the time it took them to traverse that route. You can use the same approach for someone that wants to record a path. They can send a txtbkn to a tracking site that will log their course, and then note the end of the course when the txtbkn is turned off.

In general, the txtbkn creates a mechanism for analytics relative to people's movements. A kidbkn could be sent when a kid leaves to go home from school. Analytics on the txtbkn tell the observer that the kid is traveling on the normal route or is not stopping at an odd place. Someone walking home at night could send a txtbkn to a security service that would use a tool to watch the movement of the person and only react if some strange movement occurs. In this case, the txtbkn sender wants their movement traced as he/she is heading to somewhere else. In each case, the exact location of S is not reported, just the description of the status of their movements.

txtbkns and the corresponding txtbkn server and Enterprise Txtbkn Server are useful tools for a variety of commercial applications in retail, planning and events, corporate meetings, gaming, and social networking. Incorporation of txtbkns into additional applications would also be desirable by 3rd party app developers. Some form of txtbkn SDK would be developed to enable applications to access txtbkn servers to manage txtbkns within the context of the applications being developed. New apps could then form a new source of revenue for a platform technology.

In particular, the analytics capability would enable the tracking of consumers' habits in a form that is easily configurable. Many types of consumer tracking scenarios can be created that are not possible with mapping software. Retailers and other companies can track how consumers respond to coupons in real time and then make real time modification to those coupons. In addition, retailers can easily convert customer email lists and contact information into txtbkn campaigns.

A possible way to introduce txtbkn to the market is to create a campaign with a franchise company wanting to drive customers to their coffee shops. The company would enroll people in the local store's neighborhoods and provide incentives to them to come to the location using txtbkns. Other possible partners include national restaurant chains, retail chains, etc.

You could also create treasure map type txtbkns that would have a treasure (coupon, cash, prize) at a particular location. The txtbkns would be sent out randomly to the first X people to subscribe. If you get the treasurebkn and go to the location, you get the prize. The prize could be a new txtbkn that is sent to you also, or a coupon that is sent to your cell, instead of something physical at the location.

Another way to market is to create exclusive txtbkn events that only the people who use txtbkn can go to, because the location is marked by a txtbkn, not an address. For college campuses, you can schedule a concert, and only people with the txtbkn know where it is. This type of party or event, would become a completely new way of scheduling. Remember, if people are the receiver of the txtbkn, then the txtbkn server can see their relative location to the txtbkn. S can't see the exact location, but can see statistics on how many people have the txtbkn, how many of them appear to be moving toward the txtbkn, and how many people are a certain distance away. The txtbkn could be set to automatically turn off, or to become locked, after a certain amount of people respond to it.

Although the txtbkn analytics belong to S, S could also make them available to R, or could otherwise publish or show them so that others can see how people are responding to the txtbkn. A txtbkn concert organizer could sell tickets to a concert where people don't know where it is, but are able to see the number of people going when they are on line deciding whether to buy a ticket or not (when they buy the ticket, they get a txtbkn to the concert).

Other types of txtbkn campaigns are possible where all R's get to see the group response as part of the activity. It is also conceivable that an online service might show the response of the R's as part of the activity.

The basic day-to-day use of txtbkns is to create an easy way to show someone your location when you want to meet with them, with features that easily turn off or control how long your location is available. When you need to pick up your kids from school, an event, or a friend's house, you they can send you a txtbkn.

Another use is when your kid is playing sports away somewhere. It is always hard to find the gym or field. Instead of giving directions, the venue could have a txtbkn generator that sends you a txtbkn. Another parent already there could send you a txtbkn. The on line schedule, could have a txtbkn for each event that you can sign up to receive.

When scheduling or calling a taxi, you can send it a txtbkn to find your location. This could also be a general service you set up in a city. Txtbkns could be sent to a 'need a taxi' server. The txtbkns could be 'grabbed' by a particular taxi which will pick up that person, or the general area of the city that needs taxis could be shown so that more taxis start to head there.

There can also be an application where the taxi driver can 'grab' the txtbkn, which would then link the taxi to the txtbkn and the taxibkn. S would start getting info on how far away the taxi is, while the taxi uses the txtbkn to go to the person. A bkn-bump connecting the taxi to the person would be used to validate S. This idea of 'grabbing' a bkn could be used for other applications as well. The basic idea is that people would post their bkn to a pool for a particular service and the bkn would then be assigned or acquired by someone who would then provide the service and the bkn to reach the person.)

You could hand txtbkns off. For instance, when you get in a cab, you should be able to give a txtbkn to the cab driver so they can take you to the spot. When you get out, the txtbkn goes with you.

You could foresee people creating txtbkn collections. For instance, when they reach a txtbkn, it documents that they were at a particular location. Any type of tour would be easily set up as a series of txtbkns.

Tools can be created that will enable people to develop relationships between received txtbkns. So, if you have five txtbkns and you want to go to all of them, you can ask the txtbkn Tool to get you to all of them by the quickest route. The txtbknTool can also give you information about the txtbkn based on how it is moving.

A feature and benefit of txtbkns is that the architecture for communicating the bkns between senders and recipients creates a means for providing security for the users by limiting access to the actual location of the users. For the sender/creator of the bkn, the location information is revealed to the recipient by the bkn server, but security is provided because the sender can define triggers that limit access to the bkn location. For the recipient, the bkn server uses the location information of the recipient to provide information on prompts, but the actual location of the recipient is not sent or shown to the sender. This feature protects the recipient from having his or her location information used for purposes not approved or acceptable for the recipient.

Because of this feature, a use case exists where bkns are used on web pages to provide a direct link to a location without needing to jump to a map application. For instance, for a web page being read on a mobile application, when a bkn icon is pressed, it would automatically send a bkn for that location to the mobile device and the user becomes the recipient of the bkn. No mapping application is accessed at all. The company that is promoting their location from the website would be able to see anonymized information on the relative movement of the recipient, and would not have access to the location information of the recipient.

The benefit of this is that for any retail scenario, users of the bkn campaign service will be more comfortable because their actual location is protected from the retailer. This should lead to more people using the service, while still being able to collect aggregate data, i.e., response vectors to bkn campaigns Another use for bkn campaigns is to 'cast a net' with a bkn to a set of users who are doing an activity to track them to a destination or just to assess their location or relative movement. For instance, a bkn campaign can be sent to a bunch of people driving to work in the morning. The bkn server would aggregate the relative movement of each recipient to capture a picture of rush hour traffic. A golf course could send bkns out to all of its active players to track the relative movement on the course. In each case, the actual location of the recipients is protected, even though they may have signed up to be a part of that service.

For each of these 'bkn campaign' applications of the txtbkn, a number of measurements can be made from the aggregate response vectors of the members of the campaign. A response vector is the aggregate (or average, mean, etc.) position, velocity, or acceleration vector describing the movement of the recipients' devices after receipt of the txtbkn. The vector will be time dependent so that the direction of the vector can change over time. Although any coordinate system can be used, the bkn server algorithms can be described by the location of the bkn as the center of a polar coordinate system. When a bkn is received, the location of the recipient is noted. After any time interval, the vector describing the relative movement of the bkn is defined by the angle from the line connecting the recipient original location and the bkn, and distance of a line drawn between the location at receipt of the bkn and the current location. For each additional interval of time, a new position vector is defined for that moment. The velocity vector will be defined along the same line as the position vector, but will be the distance of the position vector divided by the elapsed time since the bkn was received.

The bkn server calculates the position and velocity vectors. An aggregate vector can also be calculated from all of the current recipients of a bkn, which can be either the sum or average of all of the distance vectors, pointing at an angle equal to the average of the all of the vector angles. All of these calculated vectors, both the current vector and the time series of vectors, can be used as inputs to understanding the response of bkn recipients for a particular bkn campaign.

At this point it should be noted that techniques in accordance with the present disclosure as described above may involve the processing of input data and the generation of output data to some extent. This input data processing and output data generation may be implemented in hardware or software. For example, specific electronic components may be employed in a txtbkn management application or similar or related circuitry for implementing the functions in accordance with the present disclosure as described above. Alternatively, one or more processors operating in accordance with instructions may implement the functions in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method for users to share and manage use of relative location information, comprising:
   receiving a communication from an initiating client device to initiate a beacon file, the communication designating location information for the beacon file, at least one designated recipient for the beacon file, and at least one trigger condition for the beacon file;
   creating the beacon file including the location information and the at least one trigger condition;
   sending the beacon file to a recipient client device associated with the at least one designated recipient, wherein the beacon file further identifies the at least one designated recipient and includes a setting that controls whether the beacon file can be forwarded to an additional recipient, wherein the beacon file can be incorporated into a third party application that is used by the at least one designated recipient or the additional recipient;
   receiving a request for the location information associated with the beacon file from the at least one designated recipient or the additional recipient;
   determining that the request for the location information matches the at least one trigger condition for the beacon file;
   responding to the request for the location information by sending a location determined by the location information in the beacon file, based at least on determining that the request matches the at least one trigger condition for the beacon file;
   receiving, from two devices comprising the recipient client device and an additional device associated with the additional recipient, a plurality of responses associated with the beacon file or a past beacon file, wherein the plurality of responses include at least relative location information or interaction with the at least one trigger condition;
   generating aggregated information about a collective activity of the two devices by aggregating the plurality of responses;
   sending, to the initiating client device, the aggregated information;
   receiving, from the initiating client device, an updated beacon file based on the aggregated information; and
   sending, to the two devices, the updated beacon file;
   wherein the beacon file further includes tracking settings;
   wherein the method further comprises:
   determining that the tracking settings for the beacon file include updating the location information of the beacon file to an updated location for the initiating client device,
   after receiving the request for the location information associated with the beacon file, based on determining that the tracking settings for the beacon include updating the location information of the beacon file to an updated location for the initiating client device, sending a request for updated location information to the initiating client device, and
   after sending the request to the initiating client device, receiving updated location information from the initiating client device; and
   wherein the location information sent in response to the request for location information associated with the beacon file is the updated location information.

2. The method of claim 1,
   wherein sending the location information is based on determining that the request is sent from a client device associated with the at least one designated recipient.

3. The method of claim 2, further comprising:
   receiving a second request for location information associated with the beacon file;
   determining that the second request is not sent from a client device associated with the at least one designated recipient; and
   determining not to respond to the second request by sending location information based on determining that the second request is not sent from a client device associated with the at least one designated recipient.

4. The method of claim 1, further comprising:
   receiving a request from the initiating client device for location information about a recipient of the at least one designated recipient;
   sending a request to the recipient client device for location information about the recipient;
   receiving first location information from the recipient client device in response to the request to the recipient client device; and
   sending second location information to the initiating client device in response to the request from the initiating client device, wherein the second location information is different from the first location information.

5. The method of claim 4,
   wherein the first location information includes position coordinates of the recipient client device; and
   wherein the second location information includes at least one of a time, distance, or duration based on the first location information but does not include the position coordinates of the recipient client device.

6. The method of claim 4, further comprising:
   receiving a communication from the recipient client device indicating what location information about the recipient to provide with the beacon file, and in response, including information in the beacon file reflecting what location information about the recipient should be provided;
   wherein the second location information sent to the initiating client device in response to the request from the initiating client device is based on the beacon file indicating what location information about the recipient to provide.

7. The method of claim 1,
wherein the at least one trigger condition includes a time condition; and
wherein determining that the request for location information matches the at least one trigger condition for the beacon file includes determining that the time of the request satisfies the time condition.

8. The method of claim 7, wherein the time condition includes at least one of a specified time at which the beacon file will become active, a specified time at which the beacon file will no longer be active, and a duration of time after which the beacon file will become inactive.

9. The method of claim 1,
wherein the at least one trigger condition includes a location condition; and
wherein determining that the request for location information matches the at least one trigger condition for the beacon file includes determining that location information for the recipient client device satisfies the location condition.

10. The method of claim 9, wherein the location condition is that the location information for the recipient client device represents a different location from location information associated with the initiating client device.

11. The method of claim 1,
wherein the beacon file includes a unique identifier associated with the beacon file;
wherein the request for location information associated with the beacon file includes the unique identifier; and
wherein the method further includes using the unique identifier to retrieve information regarding the beacon file from a list including the information for a plurality of beacon files.

12. At least one non-transitory processor readable storage medium storing a computer program of instructions configured to be readable by at least one processor for instructing the at least one processor to execute a computer process for performing the method as recited in claim 1.

13. An article of manufacture comprising:
at least one non-transitory processor readable storage medium; and
instructions stored on the at least one medium;
wherein the instructions are configured to be readable from the at least one medium by at least one processor and thereby cause the at least one processor to operate so as to:
receive a communication from an initiating client device to initiate a beacon file, the communication designating location information for the beacon file, at least one designated recipient for the beacon file, and at least one trigger condition for the beacon file;
create the beacon file including the location information and the at least one trigger condition;
send the beacon file to a recipient client device associated with the at least one designated recipient, wherein the beacon file further identifies the at least one designated recipient and includes a setting that controls whether the beacon file can be forwarded to an additional recipient, wherein the beacon file can be incorporated into a third party application that is used by the at least one designated recipient or the additional recipient;
receive a request for the location information associated with the beacon file from the at least one designated recipient or the additional recipient;
determine that the request for location information matches the at least one trigger condition for the beacon file;
respond to the request for location information by sending a location determined by the location information in the beacon file, based at least on determining that the request matches the at least one trigger conditions for the beacon file;
receive, from two devices comprising the recipient client device and an additional device associated with the additional recipient, a plurality of responses associated with the beacon file or a past beacon file, wherein the plurality of responses include at least relative location information or interaction with the at least one trigger condition;
generate aggregated information about a collective activity of the two devices by aggregating the plurality of responses;
send, to the initiating client device, the aggregated information;
receive, from the initiating client device, an updated beacon file based on the aggregated information; and
send, to the two devices, the updated beacon file;
wherein the beacon file further includes tracking settings;
wherein the instructions are further configured to cause the at least one processor to operate so as to:
determine that the tracking settings for the beacon file include updating the location information of the beacon file to an updated location for the initiating client device,
after receiving the request for the location information associated with the beacon file, based on determining that the tracking settings for the beacon include updating the location information of the beacon file to an updated location for the initiating client device, send a request for updated location information to the initiating client device, and
after sending the request to the initiating client device, receive the updated location information from the initiating client device; and
wherein the location information sent in response to the request for the location information associated with the beacon file is the updated location information.

14. The article of manufacture of claim 13, wherein the instructions are further configured to cause the at least one processor to operate so as to:
receive a request from the initiating client device for location information about a recipient of the at least one designated recipient;
send a request to the recipient client device for location information about the recipient;
receive first location information from the recipient client device in response to the request to the recipient client device; and
send second location information to the initiating client device in response to the request from the initiating client device, wherein the second location information is different from the first location information.

15. A system comprising one or more processors communicatively coupled to a network; wherein the one or more processors are configured to:
receive a communication from an initiating client device to initiate a beacon file, the communication designating location information for the beacon file, at least one designated recipient for the beacon file, and at least one trigger condition for the beacon file;
create a beacon file including the location information and the at least one trigger condition;
send the beacon file to a recipient client device associated with the at least one designated recipient, wherein the beacon file further identifies the at least one designated recipient and includes a setting that controls whether the beacon file can be forwarded to an additional recipient, wherein the beacon file can be incorporated into a third party application that is used by the at least one designated recipient or the additional recipient;

receive a request for the location information associated with the beacon file from the at least one designated recipient or the additional recipient;

determine that the request for the location information matches the at least one trigger condition for the beacon file;

respond to the request for location information by sending a location determined by the location information in the beacon file, based at least on determining that the request matches the at least one trigger conditions for the beacon file;

receive, from two devices comprising the recipient client device and an additional device associated with the additional recipient, a plurality of responses associated with the beacon file or a past beacon file, wherein the plurality of responses include at least relative location information or interaction with the at least one trigger condition;

generate aggregated information about a collective activity of the two devices by aggregating the plurality of responses;

send, to the initiating client device, the aggregated information;

receive, from the initiating client device, an updated beacon file based on the aggregated information; and send, to the two devices, the updated beacon file;

wherein the beacon file further includes tracking settings;

wherein the one or more processors are further configured to:

determine that the tracking settings for the beacon file include updating the location information of the beacon file to an updated location for the initiating client device, after receiving the request for location information associated with the beacon file, based on determining that the tracking settings for the beacon include updating the location information of the beacon file to an updated location for the initiating client device, send the request for updated location information to the initiating client device, and after sending the request to the initiating client device, receive updated location information from the initiating client device; and wherein the location information sent in response to the request for location information associated with the beacon file is the updated location information.

16. The system of claim 15, wherein the one or more processors are further configured to:

receive a request from the initiating client device for location information about a recipient of the at least one designated recipient;

send a request to the recipient client device for location information about the recipient;

receive first location information from the recipient client device in response to the request to the recipient client device; and send second location information to the initiating client device in response to the request from the initiating client device, wherein the second location information is different from the first location information.

* * * * *